May 6, 1930.                 C. PEARSON                1,757,214
                    MOWER ATTACHMENT FOR TRACTORS
                    Filed June 25, 1927        3 Sheets-Sheet 3

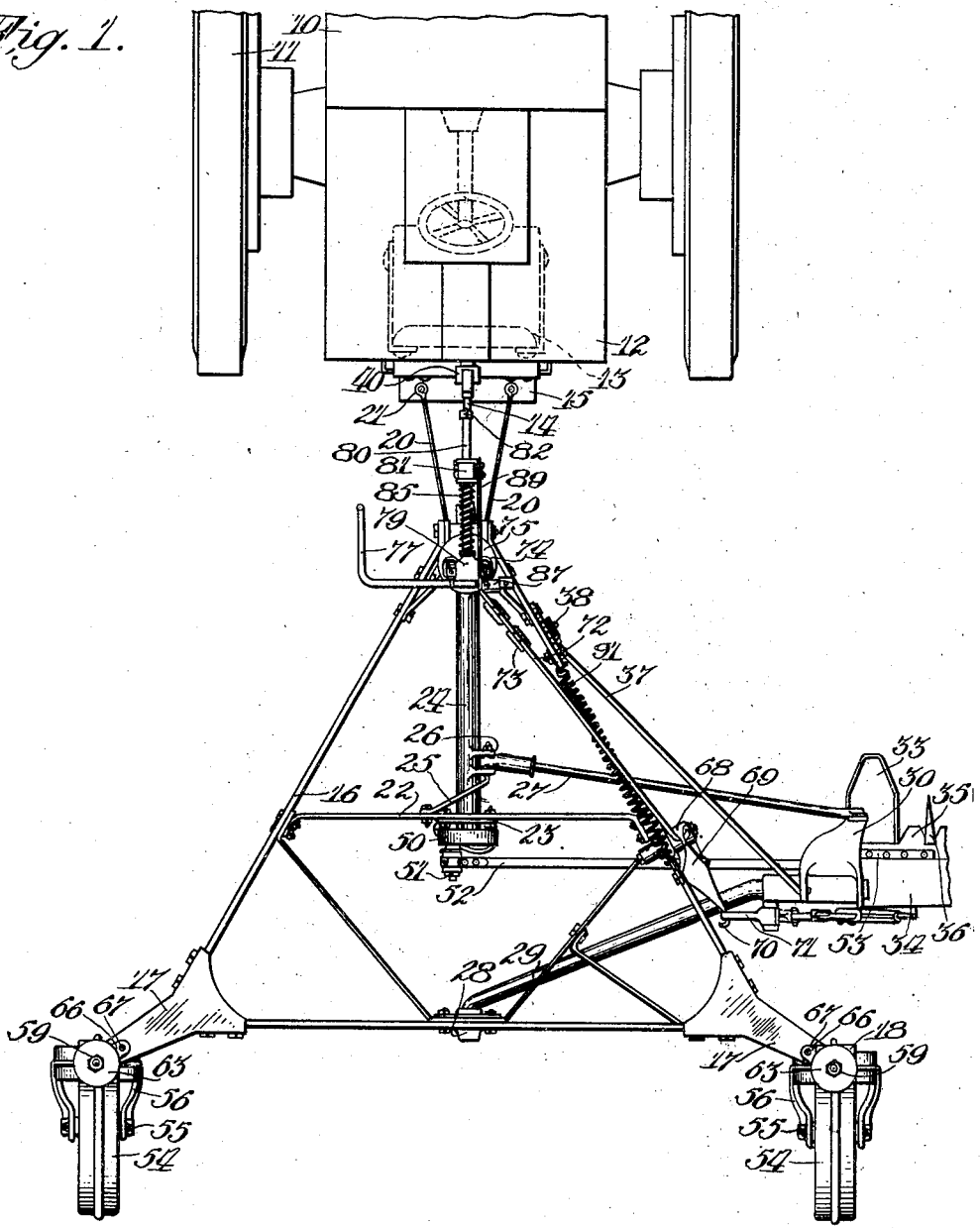

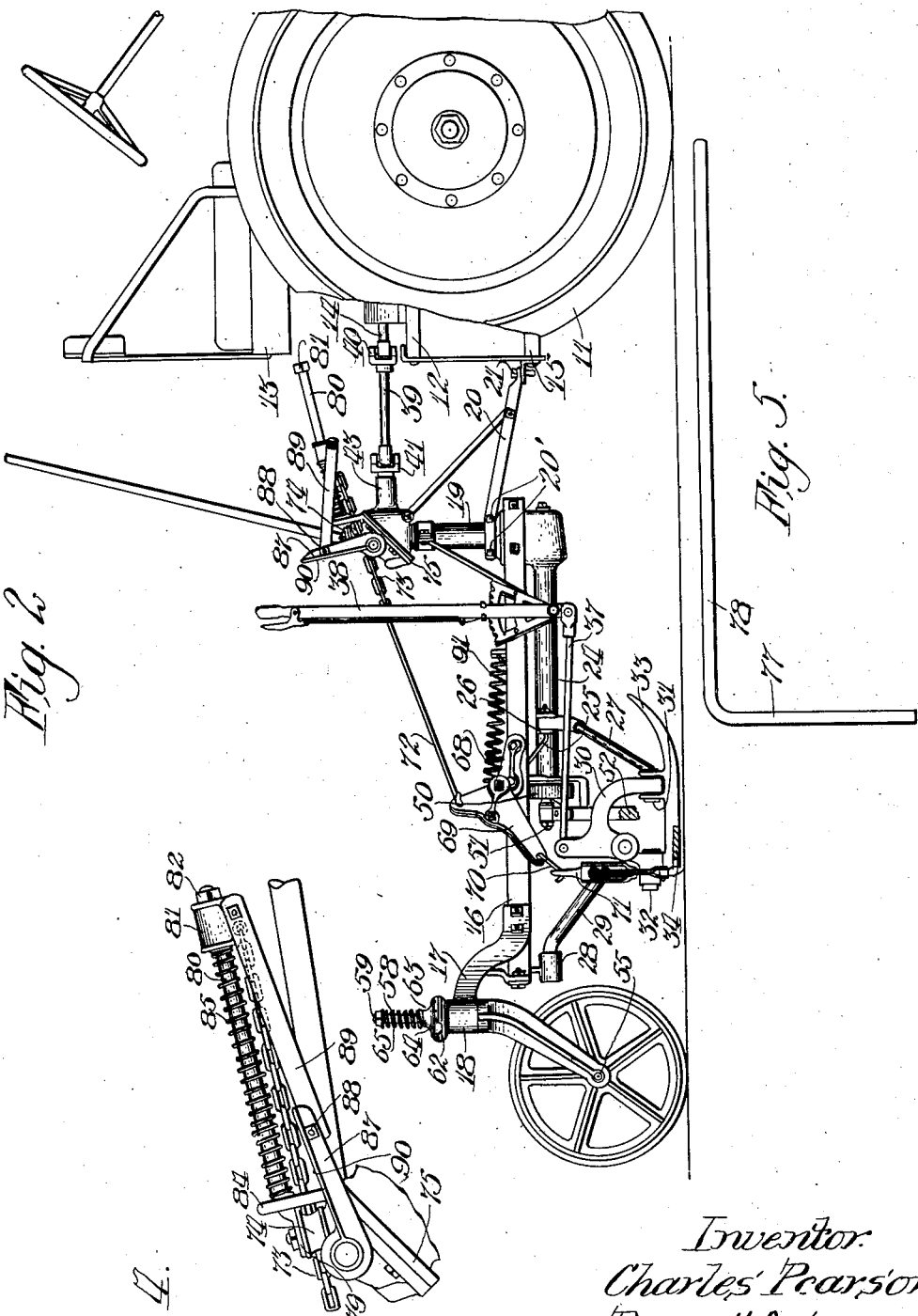

Inventor
Charles Pearson.
By
Atty.

Patented May 6, 1930

1,757,214

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

MOWER ATTACHMENT FOR TRACTORS

Application filed June 25, 1927. Serial No. 201,413.

This invention relates to mowing machines.

The mower of this invention is designed for use in connection with tractors having a draw element and a power take-off shaft, whereby a front part of said frame may be rigidly supported by a connection fixed to the draw element, its rear part being pivotally swung on such front part, the operative mechanism of the mower being power driven from the power take-off shaft of the tractor. The rear part of the mower is designed to be supported on carrying wheels. The particular mower embodiment herein disclosed is intended for use with tractors of the type now known as industrial tractors. Such tractors have their wheels usually provided with hard rubber tires to permit them to operate on hard surfaced roads.

Such industrial tractors are now commonly used for pulling mower attachments for the purpose of cutting grass and weeds adjacent hard surfaced roads. In such tractor mower outfits, the cutter bar of the mower frequently encounters an obstruction causing serious injury to the mowing machine. Further, if the mower is angularly displaced with respect to the tractor, as when the outfit is making a turn, the lever control mechanism does not remain accessible to the operator on his seat on the tractor. Generally, the present invention is designed to overcome these difficulties.

The objects of this invention are generally to improve mower attachments for tractors; to provide a mower attachment having a novel frame construction including carrying wheel supports which are normally locked against castering on straight-away travel, but are adapted to be automatically released for castering movement when the cutter bar encounters an obstruction; to provide such a mower attachment which may have its operative parts driven from the power take-off shaft of a tractor and which will uniformly transmit the power from the take-off shaft of the tractor to the cutting mechanism, regardless of the angular position of the mower attachment with respect to the tractor; to provide a novel cutter bar mounting with respect to the mower frame; and, lastly, to provide an improved lever control mechanism for effecting vertical adjustment of the cutter bar, which lever mechanism will, in all angular trailing positions of the mower attachment with respect to the tractor, be accessible to the operator from his seat on the tractor.

Other objects and advantages of the structure of this invention will be apparent to those skilled in this art as the description progresses.

Briefly, these desirable objects are achieved in a mower attachment designed for use with a tractor having a draw element and a power take-off, said mower attachment comprising a frame, the front center part of which includes a frame part and connection rigidly connected to the draw element of the tractor whereby to draw the frame and support it at its forward end. The rear end of the frame is supported on carrying wheels which rear part of the frame is pivotally mounted on the part rigidly connected to the tractor draw element. The frame pivotally carries a laterally extending coupling arm which in turn is connected to the cutter bar, which cutter bar is arranged on a line in advance of said carrying wheels. Means is provided in the mounting for these carrying wheels, which causes them normally to be locked against castering, which means, however, becomes automatically unlocked, should the bar encounter an obstruction, with a predetermined force sufficient to twist the frame and cause said wheels to caster to relieve the resistance of the obstruction, to prevent injury to the cutter bar and its cutting mechanism. The frame carries a longitudinal casing in which is enclosed a shaft having a connection for driving the cutting mechanism. The other end of this shaft is connected to an upright shaft carried in an upright housing or standard, the upright shaft therein, in turn, being driven from the tractor power take-off. The gear connections are such that power is evenly transmitted from the power take-off shaft to the cutting mechanism, regardless of the angular disposition of the mower attachment with respect to the tractor. The upright housing standard carries a lever mechanism connected for vertically adjusting the cutter bar and because this lever mounting is located in the vertical axis of turning movement for the pivoted frame part, it will not be angularly displaced with respect to the tractor when the mower attachment and tractor are relatively angularly displaced and thus the lever is always accessible to the operator on the tractor.

Looking now to the several sheets of drawings, wherein an illustrative embodiment of this invention has been shown, it will be seen that,—

Figure 1 is a general plan view of the improved mower trailing behind an industrial tractor, the mower being supported on the draw element of the tractor and connected to be driven by the tractor power take-off;

Figure 2 is a general side elevational view of the same structure shown in Figure 1;

Figure 3 is a side elevational sectional view of the upright housing standard and the shaft and gear connections;

Figure 4 is an enlarged side elevational detail view of the lever adjusting means for lifting the cutter bar;

Figure 6:
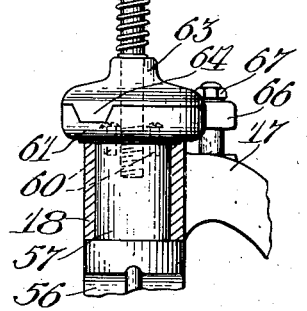
Figure 6 is a vertical side view, partly in section, of one of the carrying wheel mountings.
Figure 5:
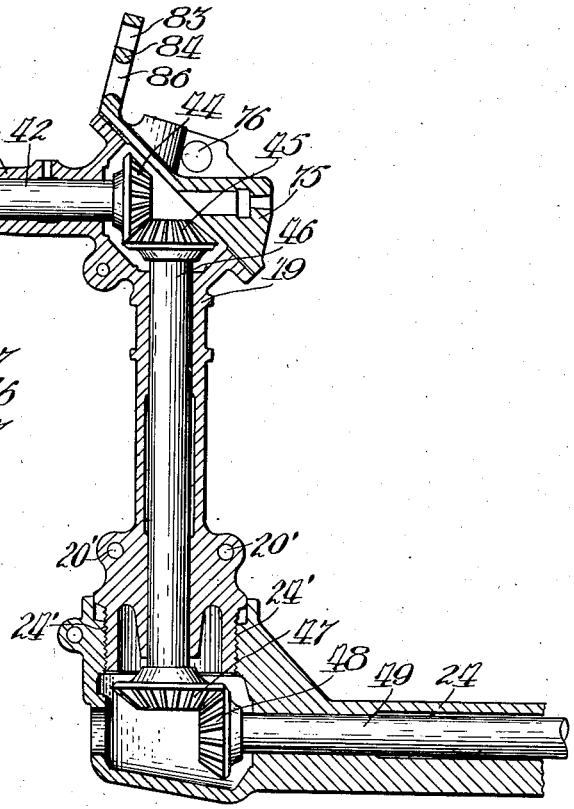
Figure 5 is a detail of the lift lever per se.
Figure 7:
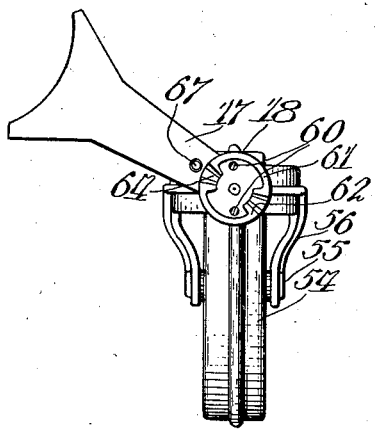
Figure 7 is a plan view of this construction with certain parts removed.
Figure 8:
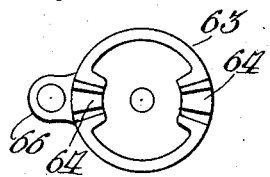
Figure 8 is a bottom detail view of one of the parts for the wheel mounting.

The tractor may be be any standard tractor, such as the industrial tractor shown, having a body 10, carrying wheels 11, operator's platform 12, operator's seat 13, power take-off shaft 14, and a draw element such as the angle bar 15.

The improved mower attachment in the form herein shown, comprises a triangular main frame 16, the sides of which are connected at the rear by brackets 17, each of which embodies a vertically disposed collar part 18. The converged portion or apex at the front end of the frame carries an upright housing or standard 19, which standard rigidly carries adjacent its lower end, or just above the main frame 16, a pair of drawbars 20 which diverge forwardly and are each detachably connected by pins 21 at spaced points to the draw element 15 on the tractor. It is to be understood that these bars 20 are bolted to the upright housing part at 20' and embrace the standard 19 in a manner to make the part 19 in effect a part of the tractor, as can be seen.

The main fame includes a transverse cross brace 22 which centrally carries a depending bracket 23 for supporting a longitudinal and centrally disposed housing 24 pivotally connected, as best shown in Figure 3, with the upright standard housing 19 at its lower end by means of the loosely threaded connection 24'. The piece 22 also carries a rod 25 on its forward side, which rod is angularly bent to pass through a pair of apertured ears 26 formed with the housing 24, the angularly bent end of the rod 25 carrying pivotally a grasswardly extending coupling rod 27. In longitudinal alinement with the housing 24 the rear side of the main frame carries a bracket 28 for pivotally mounting a grasswardly extending coupling arm or bar 29, said bar rockably carrying at its free end a conventional coupling yoke 30, to which is pivotally connected, by means of an angularly bent end 31 on the rod 27 and a pin 32, a coupling shoe 33. This coupling shoe 33 carries in the usual manner a cutter bar 34 provided with the usual cutter mechanism 35 operable between guards 36.

This cutting mechanism may be conventionally tilted through the medium of a rod 37 connected to an ear at the upper end of the yoke 30 at one end and at its other end to the bottom end of a hand lever 38 pivotally mounted on the grassward side of the main frame 16.

The cutting mechanism 35 is designed to be power driven from the take-off shaft 14 of the tractor. It will be noted that this take-off 14 is connected to a shaft 39 by means of a universal knuckle 40; and, by means of a knuckle 41 at its other end is connected to a shaft 42 which is journaled for rotation in a gear box 43 formed at the top end of the standard 19. The rear end of the shaft 42 carries a bevel gear 44 which meshes with a bevel pinion 45 fast on the upper end of a vertical shaft 46 journaled in and enclosed by the upright housing 19. The lower end of this shaft 46 carries a bevel gear 47 in mesh with a bevel gear 48 carried on a longitudinal and rearwardly extending shaft 49 journaled in and enclosed by the longitudinal housing 24. The rear end of this shaft 49 protrudes out of the rear end of the housing 24 and carries there a flywheel 50, said flywheel being provided with the usual eccentric wrist pin 51 carrying a pitman 52, which connects the shafting described with a usual knife head 53 for reciprocating the cutting mechanism 35.

As mower outfits pulled by a tractor are run at a relatively high rate of speed, great injury would be caused the cutter bar and its mechanism, should the same encounter an obstruction. Such obstructions are frequently encountered before the operator can throw his tractor out of gear to save the mower bar from injury. This invention includes means for safe-guarding the cutter bar and its mechanism under such conditions.

The rear corners or angles of the triangular mower frame are supported on a pair of trailing wheels 54. As the mounting for each of these wheels is identical, it will be sufficient to describe merely one of them. Each wheel is carried on a transverse pin 55, the pin being locked in the bifurcations of a yoke 56, which yoke extends forwardly and upwardly where its parts join to form a spindle 57 loose in the collar 18 on the bracket 17. The top side of the spindle 57 is centrally bored out and tapped to receive a vertical bolt 58 having an adjusting nut 59. By means of offset screws 60, the head of the spindle 57 rigidly carries a circular plate 61 having therein a pair of diametrically opposite dwells 62. The bolt 58 carries a similar plate 63, which latter plate 63, however, is inverted in that it includes diametrically opposed rises 64 which are pressed normally into the dwells 62 by means of a coil compression spring 65 encircling the bolt 58, as best shown in Figure 6. The plate 63 additionally is provided with an apertured ear 66, which receives a bolt 67 for locking it with the adjacent bracket 17 on the main frame. The operation of this structure will later be described.

Lever mechanism is provided, of an improved form, for effecting vertical lift adjustment of the cutter bar to intermediate position for permitting the outfit to pass ordinary obstructions. The grassward side of the main frame 16 carries a bushing 68 in which is rockably mounted a lifting arm or bell crank 69, one arm of which is connected by a hook 70 to a pull link 71 conventionally connected to the rear end of the coupling shoe 33. The remaining arm of the bell crank is connected by a link 72 to a chain 73 which passes between a pair of guide rollers 74 turnably mounted on a cover plate 75 for the gear box 43 at the top end of the relatively non-movable upright standard 19. Carried in an opening 76 in this cover plate is rockably mounted the lateral portion 77 of a lever 78, which extends in the direction of the operator's seat on the tractor where it is readily accessible for manipulation. The rollers 74 on the cover plate 75 are held in place by a bifurcated plate 79 which is merged with a rod 80 carrying at its forward end a collar 81 slidable therealong and is prevented from coming thereoff by means of a nut 82. This rod 80 passes through an opening 83 in the upper end of an upright wall 84 formed with the cover head 75. This wall 84 also forms a stop for a spring 85 arranged to encircle the rod 80 between the collar 81 and the wall 84. The chain 73 passes between the two rollers 74 and through an opening 86 at the bottom of the wall 84 and then on forwardly to be connected to the sliding collar 81 on the rod 80.

The transverse portion 77 of the lever 78 fixedly carries at its grassward end an arm 87 having a pivotal connection 88 with another arm 89 in turn pivotally connected to the collar 81. It will thus be seen that the arms 87 and 89 form a toggle lever, and, as the arm 87 is provided with a locking ledge 90 to overlap the arm 89, the toggle will lock below dead center to retain the cutter bar in plain vertically adjusted position. A counter-balancing spring 91 is provided between the bell crank lifting arm 69 and any forward point on the frame, as shown in Figure 1, to assist lifting of the cutter bar by the lever 78, as will be understood. The operation of the improved mower attachment will now be described.

The forward end of the main frame 16 by means of the part 19 is rigidly connected by the members 20 to the draw element 15 of the tractor, and the shafting 39 which may be of any usual splined or telescopic construction, will be connected to the take-off 14 on the tractor. The operator in his seat 13 on the tractor is now ready to start. Throwing the tractor transmission in gear operates the take-off 14 which drives the shafts 39, 42, bevel gears 44, 45, vertical shaft 46, which in turn imparts rotation to the longitudinal shaft 49, the flywheel 50, the rotation of which is converted into reciprocatory movement by the eccentric pin 51 and the pitman 52 to reciprocate the cutting mechanism 35 by means of the knife head 53. The cutter bar, it will be noted, is arranged on a line in advance of the trailing frame carrying wheels 54 and has its pivotal connections at 28 and 26 arranged substantially on the longitudinal median line of the frame.

As for the wheel mountings, the springs 65 normally act to lock the plates 63 and 61 together, the wheels 54 trailing the tractor properly at all times and in all angular positions of the mower frame with respect to the tractor because all pivotal movement of the tractor is on a vertical axis through the upright standard or housing 19, because of the loose, threaded, turnable connection 24' of the housing and frame part 24 to said standard as has been described. In the event the cutter bar encounters an obstruction offering sufficient resistance, as can be predetermined by varying the compression on the springs 65 by the nuts 59, a twisting strain on the frame 16 resulting therefrom, will be imparted to the brackets 17, and, as these brackets are securely bolted to the lower plates 61, the wheels 64 will be freed and be caused to caster to permit the entire frame to swing rearwardly and relieve the cutter bar of the force applied thereto caused by the obstruction encountered. Thus, it will be seen that the lower plate 61 will be turned or twisted relative to the upper plate 63 to release the coupling between the dwell and rise locking parts against the pressure of the spring 65 to cause the wheels to caster. In this manner, the cutter bar will be relieved and damage thereto will be avoided. On a straight-away pull again with the frame relieved of all twisting strain or torque, the wheels automatically are locked once more against castering, or they may, obviously be manually returned to normal trailing locked position. By means of the lever 38 and its connection 37 to the coupling yoke 30, the cutter bar may be tilted. If it is desired to adjust the cutter bar vertically to intermediate or plain lift position, the operator grasps the lever 78, pulling it toward him to rock the arm 87 forwardly, causing the link 89 to push the collar 81 ahead on the rod 80, thereby pulling on the chain 73 to operate the bell crank 69 for lifting the cutter bar, through the hook 70 and pull link 71. The arms 87 and 89, being a toggle link, are caused to interlock and retain the bar in adjusted position. As the lever 78 is mounted on the cover plate 75 at the upper end of the relatively non-movable standard 19, such lever will at all times be accessible to the operator on his seat 13, because this lever is mounted substantially in the vertical axis of turning movement of the frame parts and further because the part 19 in effect is mounted in a manner to be a rigid part of the tractor, and, as a result, angular displacement of the mower attachment cannot throw the hand lever 78 out of reach of the operator.

It is to be understood that only an illustrative embodiment of this invention has been shown and described and that the same is susceptible of modification and changes, and that it is the intention to cover all such changes as do not depart from this invention as is indicated in the following claims.

What is claimed is:

1. A mower attachment for tractors having a draw element, said mower comprising a frame adapted to be connected to said draw element, a cutting mechanism connected to the frame, means for driving the same, wheels carrying the frame, means normally locking said wheels against castering, and means causing said wheels to caster when the cutting mechanism encounters an obstruction with a predetermined force.

2. A mower attachment for tractors having a draw element, said mower comprising a frame adapted to be connected to said draw element, a cutting mechanism connected to the frame, means for driving the same, trailing wheels carrying the frame, means for normally locking the wheels against castering, and means causing said wheels to caster when the cutting mechanism encounters an obstruction with a predetermined force.

3. A mower attachment for tractors having a power take-off and a draw element, said mower comprising a frame adapted for connection to and be supported at one end by said draw element, a cutting mechanism connected to the frame, means adapted for driving said cutting mechanism from the power take-off, carrying wheels for the other end of the frame normally locked against castering, and means for causing said wheels to caster when the cutting mechanism encounters an obstruction with a predetermined force.

4. A mower attachment for tractors having a draw element, said mower comprising a triangular frame having its apex adapted to be connected to and be supported by said draw element, a cutting mechanism connected to the frame, carrying wheels for the rear end of the frame, means normally locking said wheels against castering, said means being releasable when the cutting mechanism encounters an obstruction with a predetermined force to cause said wheels to caster.

5. A mower attachment for tractors having a draw element and a power take-off, said attachment comprising a swingable wheel carried frame including a part adapted rigidly to be connected to said draw element for trailing the attachment behind the tractor, a cutting mechanism including a coupling arm pivotally connected to the frame in a manner to cause said cutting mechanism to be extended laterally of the frame, and driving connections for the cutting mechanism adapted to be connected to the power take-off to be operable thereby in all angular trailing positions of the mower with respect to the tractor.

6. A mower attachment for tractors having a draw element and a power take-off, said attachment comprising a swingable wheel carried frame including a housing part adapted to be rigidly connected to said draw element for trailing the attachment behind the tractor, a cutting mechanism including a coupling arm pivotally connected to the frame in a manner to cause said cutting mechanism to be extended laterally of the frame, another housing part on the frame enclosing a shaft connected to drive the cutting mechanism, the first mentioned housing pivotally communicating with the second mentioned housing part and enclosing a shaft geared to drive the first shaft, and means geared to the second shaft adapted to be operated by the power take-off on the tractor.

7. A mower attachment for tractors having a draw element and a power take-off, said attachment comprising a wheel carried frame adapted to be connected to said draw element to trail the tractor, a cutting mechanism including a coupling arm pivotally connected to the frame in a manner to cause said cutting mechanism to be extended laterally of the frame, a longitudinal housing on the frame enclosing a shaft connected to drive the cutting mechanism, an upright housing communicating with the first housing and enclosing a shaft geared to drive the first shaft, and a shaft adapted to be connected to the tractor power take-off and to the upright shaft.

8. A mower attachment for tractors having a draw element and a power take-off, said mower comprising a wheel carried frame, a cutting mechanism including a coupling arm pivotally connected to the frame in a manner to cause said cutting mechanism to be extended laterally of the frame, a housing embodying an upright part, said housing enclosing mechanism connected with the take-off for driving the cutting mechanism, means adapted for connecting the housing to the tractor draw element, and means carried on the upright housing part for adjusting the cutting mechanism.

9. A mower attachment for tractors having a draw element and a power take-off, said mower comprising a wheel carried frame, a cutter bar including cutting mechanism and a coupling arm connected to said frame, means for driving said cutting mechanism from the power take-off, an upright housing part on the frame enclosing part of said means, means adapted for connecting the housing to the tractor draw element, means permitting the frame to swing angularly with respect to the upright part, and lever mechanism on said upright housing part for adjusting the cutter bar.

10. A mower attachment for tractors having a draw element, said mower comprising a swingable triangular frame including a non-swinging member adapted for connecting the apex of the frame to the draw element, carrying wheels for the rear side of the frame, and a cutter bar including a coupling arm pivotally connected to said frame in a manner to dispose said cutter bar on a line in advance of the wheels and in lateral offset relationship with respect to the frame.

11. A mower attachment for tractors having a draw element and a power take-off, said mower attachment comprising a frame including a central connection from its front end adapted to be connected to the draw element, a longitudinal shaft on the frame adapted to be connected to be driven from the take-off, a cutter bar including cutting mechanism, a coupling arm for pivotally connecting the cutter bar to the frame at a point in substantial longitudinal alinement with the longitudinal shaft, and means operable by the shaft for driving the cutting mechanism.

12. A mower attachment for tractors having a draw element and a power take-off, said mower attachment comprising a frame, a laterally extending cutter bar pivotally connected to the frame, driving mechanism including a main vertical shaft adapted to be connected to the take-off, pivoted means in the attachment at a point in substantial alinement with the axis of the main shaft, and means adapted for rigid connection to the tractor draw element whereby the attachment may trail the tractor and swing angularly with respect thereto about an axis substantially coincident with the axis of the said main drive shaft.

13. A mower attachment for tractors having a draw element and a power take-off, said mower attachment comprising a frame, a laterally extending cutter bar pivotally connected to the frame, driving mechanism including a main vertical shaft adapted to be connected to the take-off, said shaft being enclosed in an upright housing on the frame, means pivotally connecting the frame to the upright housing in substantial alinement with the axis of the said shaft, said housing adapted for rigid connection to the tractor draw element whereby the attachment may trail the tractor and swing angularly with respect thereto about an axis substantially coincident with the axis of said drive shaft, and a lever connected for raising the cutter bar, said lever being mounted on the said upright housing.

In testimony whereof I affix my signature.

CHARLES PEARSON.